Patented Nov. 25, 1924.

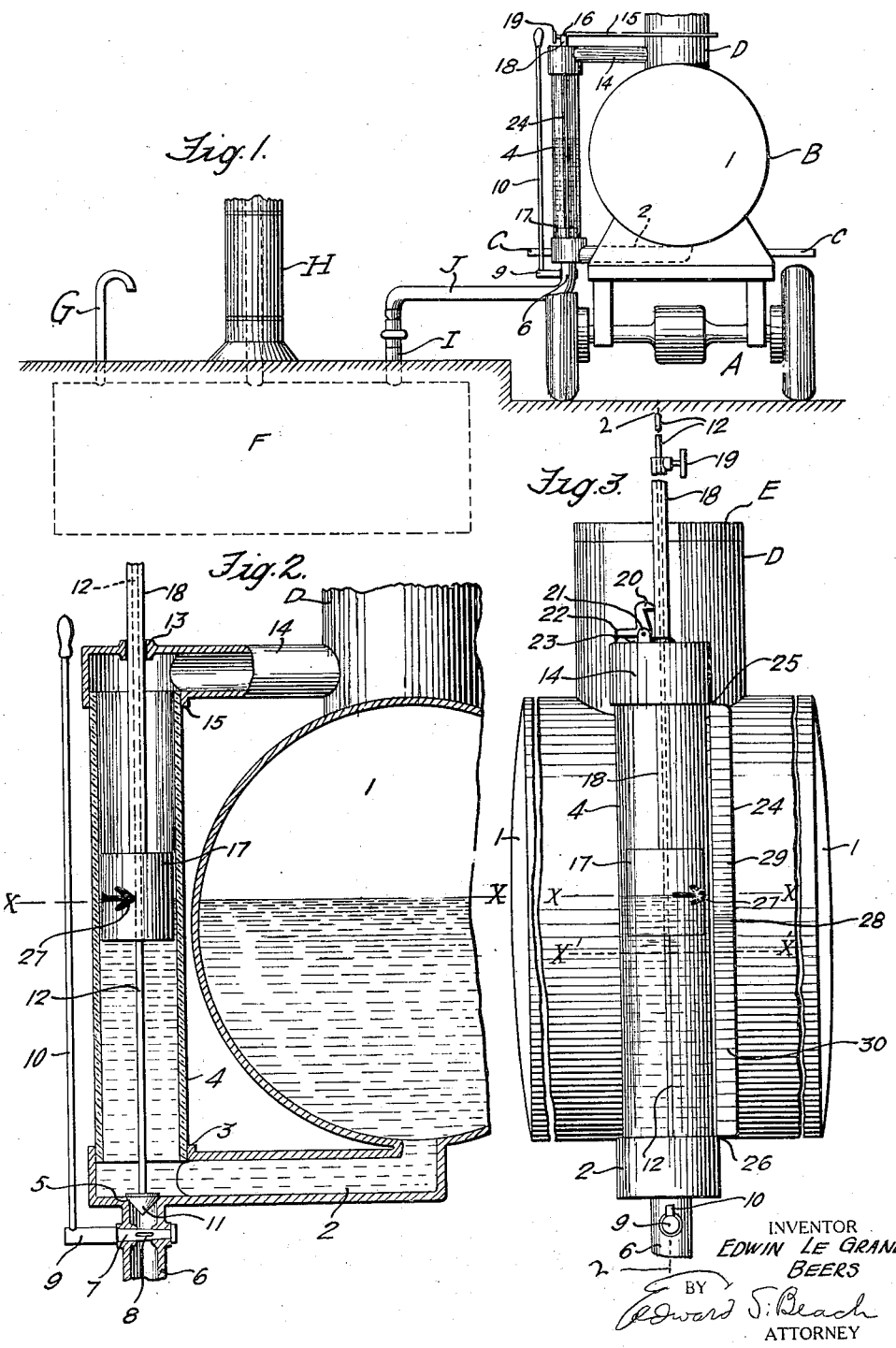

1,516,839

UNITED STATES PATENT OFFICE.

EDWIN LE GRAND BEERS, OF BROADALBIN, NEW YORK.

LIQUID-FUEL-DELIVERY-TANK VEHICLE.

Application filed November 19, 1923. Serial No. 675,786.

*To all whom it may concern:*

Be it known that I, EDWIN LE GRAND BEERS, a citizen of the United States, and resident of Broadalbin, in the county of Fulton and State of New York, have invented certain new and useful Improvements in Liquid-Fuel-Delivery-Tank Vehicles, of which the following is a specification.

This invention relates to liquid fuel delivery tank vehicles.

Its objects are,—avoidance of waste of liquid fuel at the discharge end of delivery pipes of said vehicles and of the wetting down with inflammable liquid of ground at the intakes of liquid fuel storage tanks filled from the delivery vehicles; increased liquid carrying capacity of cylindrical tanks such as now have a rear end space for reception of measuring receptacles, etc.; disuse of the manual measuring sticks now commonly used to determine the quantity of fuel delivered; convenience in manipulation of the delivery mechanism; and an automatic measuring of the liquid to be delivered coupled with an automatic cut-off of the liquid in the vehicle tank when the predetermined quantity has been discharged into the receiving, storage tank.

In the accompanying drawings forming a part hereof and illustrating the principle of the invention in the best mode now known to me of applying that principle:

Fig. 1 is an elevational view showing the rear end of a delivery tank vehicle piped to an underground receiving, storage tank provided with a vent to the atmosphere and connected with an upstanding pump partially shown.

Fig. 2 is a transverse sectional view through a portion of the vehicle tank and my new automatic measuring mechanism, at a line corresponding to line 2—2 of Fig. 3.

Fig. 3 is a side elevation of the mid-sectional portion of the vehicle tank showing my said measuring mechanism in elevation.

In the illustrated form of the invention, A indicates a delivery tank vehicle; B is the lengthwise extending, cross-sectionally cylindrical delivery tank; C the usual foot boards carried by the vehicle along each side of the tank; D the filling dome of said tank; E the dome cover; F an underground receiving, storage tank to be filled; G its vent to the atmosphere; H a portion of a delivery pump for the tank F; I the intake tube of the tank F; and J a pipe, preferably flexible, for connecting the delivery tank B with the intake tube I of the tank to be filled, during a filling operation.

In the illustrated form of the invention, referring to the novel features of the construction illustrated and to Fig. 2, it is noted that my new automatic measuring apparatus is mid-way between the ends 1 of the vehicle tank in order that delivery from the tank may be at the portion thereof at which outflow, in terms of measured units, will be obtained with very approximate uniformity, even though the vehicle is standing on a slight incline during delivery and not on a level. Theoretically, the delivery tank B should be on a level during the operation of my automatic measuring mechanism, because each liquid layer of a given depth and of a uniform depth lengthwise and widthwise of the cylinder will be of a cubical content, corresponding to gallonage, best suited for operation of the automatic measuring mechanism. Nevertheless, under most road conditions where deliveries are to be made from roadside pump and tank installations, or the like, the delivery tank will stand at an approximate level as successive gallonage-forming layers of uniform depth throughout the length and width of the cylinder are delivered.

Tank B is formed with an under lateral chambered extension 2 in constant communication with its under portion. The outer end of extension 2 is annularly upturned at 3 and the bottom of an upstanding, open-ended, glass, observation tube 4 is firmly fixed therein. The under wall of extension 2 has an outlet port enclosed by an upwardly flaring valve seat 5 which is at the intake end of the discharge, shut-off valve 6 with which the pipe J is in communication. The shut-off valve comprises a horizontal, rockable valve plug 7 having a transverse exit port 8. The valve plug stem 9 extends outwardly through the casing of the valve and is provided with an upstanding lever handle 10 conveniently opposite a side of the tank dome and operable from a foot board. This manually controlled shut-off valve is used during travel and housing of the tank vehicle.

An automatic acting cut-off valve forming a part of the measuring mechanism is indicated by 11, seats downwardly on the valve seat 5 and unseats in an upward direction. It controls communication between the chamber of the tank, chambered extension 2 and observation tube 4. The valve rod 12 of valve 11 extends upwardly through a guide tube mentioned below, slidable thereto and thereabove through a gland guide 13 in the upper wall of an upper laterally and outwardly projecting conduit extension 14, alined with the under extension 2, having its inward end leading from the dome D, and its outward end downturned annularly at 15 for reception of the upper end of the observation tube.

The valve rod 12 is made segmental, its upper end being supplemented by a cantable handle forming extension 15 the under end of which is pivoted at 16 to the upper end of the rod 12. When the apparatus is not in use the upper portion of the rod 12 may be canted downwardly out of the way, as shown in Fig. 1.

Liquid in the tank and observation tube will stand naturally and normally at the same level, as at the high level line x—x in Fig. 2.

On the valve rod 12 there is mounted, in slidable relation thereto, a floatable, observable piston 17 slidable and somewhat loosely engaging the inner wall of the observation tube. The valve 12 extends through a central opening in the piston. The upper end of the piston is provided with a fixed, upstanding valve rod guiding tube 18 slidable through the guide gland 13.

The sectional guide rod 12 and 15 is cross sectionally dimensioned so as to be in freely slidable relation to the inner wall of its guide tube 18. The upper end of the guide tube is provided with a set screw 19 by means of which this guide tube fixed to the piston and the valve rod 12 may be clamped together so that the automatic valve 11, its segmental rod, the piston and the guide tube may become a measuring unit.

An upstanding latch 20 pivoted at 21 and having a shank 22 pressed upwardly by a spring 23 serves to engage the shank of the set screw 19 when the piston is in its lowermost position and hold the piston down during housing and travel of the tank vehicle.

A vertical, transversely calibrated indicator 24 of quantities delivered is shown with its upper end fixed at 25 to the upper extension end 15 and its under end fixed at 26 to the under extension end 3, adjacent the observation tube and in readable relation to an arrow on the piston 17. The calibration mark 28 which is the calibration mark midway between the calibrations on the indicator, is in alinement with the horizontal diameter of the tank B, the calibrations 29 above the mid-length line 28 and below the latter are spaced increasingly apart because of the circular cross-section of the delivery tank wherein a cross-sectional layer of given depth and in axial relation to the horizontal diameter and lengthwise axis of the tank will have the greatest cubical content and gallonage; and successive upper layers and successive under layers of given depth will have decreased cubical content and gallonage; it is therefore necessary, in a cross-sectionally round tank structure, to deliver a greater depth of liquid at the top or bottom of the tank for a predetermined quantity than it is from any intermediate portion of the tank.

Midway between its end, the piston 17 is provided with the visible arrow 27 pointing towards the calibrated indicator and readable through the observation tube in relation to calibrations on the indicator.

It will be noted that the upper surface of liquid in the tank and of liquid in the observation tube are open to equal air pressure; and that the measuring piston 17 is, when in measuring position shown in Fig. 2, submerged for one-half its length in the liquid in the observation tube which rises to the high level line x—x shown.

Having thus described the mechanical parts involved in this invention, the mode of operation of the mechanism or apparatus remains to be set forth:

When the piston is unlocked from its position of rest, it is buoyed up to its highest position by the liquid and floats therein. The valve 11 remains seated by weight of liquid on it and the shut-off valve plug 7 is closed. The operator for delivery purposes adjusts the piston tube downwardly until the arrow on the piston indicates by reference to the indicator the gallonage required, as at the line x'—x'. Then the operator clamps the valve rod and piston tube together whereupon the buoyant piston ascends to its normal level at which the arrow is in the line x—x, the piston in its ascent lifting the valve 11 from its seat 5 at a distance corresponding to the vertical distance between the lines x'—x' and x—x. The shut-off valve being then opened, the liquid flows out and the piston and valve as a unit move downwardly until the valve seats. The operator may then close the shut-off valve and readjust the parts into position of rest, as described, and proceed about his business.

Having thus described the principle of the invention in the best form now known to me and intending that the annexed claims shall include all other forms of the invention operating on the same principle,

What I claim is:

1. The combination of a liquid holding tank having an opening for filling and a discharge port; a measuring and discharging mechanism in communication with said discharge port, said mechanism comprising an upstanding observation tube communicating at its top and bottom with said tank; a buoyant member slidably mounted in said tube and supportable by the liquid to be measured; an adjustable cut-off valve carried by said buoyant member and comprising a valve rod extending upwardly through said buoyant member; means for adjustably connecting the rod and buoyant member, the valve being automatically seatable by escape of outflowing liquid when the desired quantity has been dispensed; an escape port controlled by said valve above the discharge port; a seat for said valve; and a calibrated scale for indicating the quantity of liquid delivered past said valve, the scale being readable in connection with the position of the buoyant member when the valve carried by it is seated.

2. The combination with a liquid holding tank having an opening for filling and a discharge port; a measuring and discharging mechanism comprising an upstanding observation tube communicating with said tank at its top and bottom; a buoyant member slidably mounted in said tube, said member being supportable in the tube by the liquid to be measured; a calibrated scale for indicating the quantity of liquid delivered past said valve, the scale being readable in connection with the position of the buoyant member when the valve carried by it is seated; an adjustable cut-off valve carried by said buoyant member, the said valve being provided with a valve rod extending upwardly through said buoyant member; means for adjustably connecting said rod and buoyant member, the valve being automatically seatable by escape of outflowing liquid when the desired quantity has been dispensed; a discharge pipe communicating with said discharge port, and a manually operable control valve mounted in the discharge pipe outwardly of the valved port; said measuring and discharging mechanism also comprising upper and under chambered extensions in communication with the tank, one of such extensions being in communication with the under end of said observation tube, and such chambered extensions being located at the mid-length part of the tank.

3. A tank having a filling port, upper and under, spaced apart chambered extensions in communication with the tank chamber; an open ended, upstanding observation tube in communication at each end with one of said chambered extensions; a manually adjustable measure indicating piston slidable in the observation tube, such piston having a visible indicator; a cut-off valve having an upwardly extending valve rod on which the piston is slidably mounted; and an upstanding valve rod guide tube fixed in the piston and through which said rod extends; means for detachably connecting said guide tube and rod together; and, adjacent the observation tube, a visible indicator readable in connection with said visible indicator on the piston; the under extension having an exit port provided with a seat for said valve; and such valve being seatable by descent of the piston when said rod is in fixed relation to it.

4. The combination with a tank for holding liquid of an automatically measuring and discharging mechanism comprising a conduit in communication with the chamber of the tank and within the conduit, automatic measuring and discharge control means operable by fall of liquid in the tank; said means comprising a buoyant member, a chambered casing therefor in communication at its lower end with the tank by a conduit provided with a valve control port; a downwardly seating valve therefor; and means for adjustably connecting said valve with the said buoyant member.

Signed at New York city, in the county of New York and State of New York, this 12th day of November, A. D. 1923.

EDWIN LE GRAND BEERS.